United States Patent
Ohr

(10) Patent No.: US 7,363,447 B1
(45) Date of Patent: *Apr. 22, 2008

(54) SYSTEM AND METHOD FOR PROVIDING SAFE DATA MOVEMENT USING THIRD PARTY COPY TECHNIQUES

(75) Inventor: James P. Ohr, St. Paul, MN (US)

(73) Assignee: Symantec Operating Corporation, Cupertino, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 11/047,172

(22) Filed: Jan. 31, 2005

Related U.S. Application Data

(63) Continuation of application No. 10/881,313, filed on Jun. 30, 2004, now Pat. No. 6,883,076, which is a continuation of application No. 10/212,427, filed on Aug. 5, 2002, now Pat. No. 6,772,308, which is a continuation-in-part of application No. 09/924,228, filed on Aug. 7, 2001, now Pat. No. 6,721,851.

(51) Int. Cl.
*G06F 12/16* (2006.01)

(52) U.S. Cl. ............... 711/163; 711/154; 711/161; 711/162; 710/200; 710/240

(58) Field of Classification Search ............ 711/154, 711/161–163; 710/200, 240
See application file for complete search history.

(56) References Cited

U.S. PATENT DOCUMENTS

| | | | |
|---|---|---|---|
| 5,155,845 A | 10/1992 | Beal et al. | 395/575 |
| 5,251,318 A | 10/1993 | Nitta et al. | 395/725 |
| 5,506,980 A | 4/1996 | Inagami et al. | 395/486 |
| 5,692,155 A | 11/1997 | Iskiyan et al. | 395/489 |
| 5,832,515 A | 11/1998 | Ledain et al. | 707/202 |
| 5,944,789 A | 8/1999 | Tzelnic et al. | 709/214 |
| 6,108,749 A | 8/2000 | White et al. | 711/112 |
| 6,173,312 B1 * | 1/2001 | Atarashi et al. | 709/203 |
| 6,173,377 B1 | 1/2001 | Yanai et al. | 711/162 |
| 6,189,079 B1 * | 2/2001 | Micka et al. | 711/162 |
| 6,209,070 B1 | 3/2001 | Reed et al. | 711/165 |

(Continued)

OTHER PUBLICATIONS

*Working Draft*, Project T10/1416-D, Information Technology—SCSI Primary Commands—3 (SPC-3), Revision 03, Reference No. ISO/IEC 14776-313: 200x, ANSI NCITS (American National Standards Institute, Inc). ***;200x, Jan. 10, 2002, pp. iii-xxiv & 1-330.

*Primary Examiner*—Stephen C. Elmore
*Assistant Examiner*—Daniel Kim
(74) *Attorney, Agent, or Firm*—Campbell Stephenson LLP

(57) ABSTRACT

Systems, methods, apparatus and software can utilize an extent guard to prevent modification (including relocation) of data in the storage resource while a third-party copy operation directed at the storage resource is occurring. A data transport mechanism such as a data restore application provides an extent list to the extent guard, which monitors read and/or write activity to storage resources described by the extent list. The data transport mechanism requests a data mover to perform a third-party copy operation whereby data is moved from a data source to the storage resource. If a modification attempt is made on the portion of the storage resource described by the extent list, the extent guard stalls the modification attempt until the third-party copy operation is aborted.

18 Claims, 8 Drawing Sheets

U.S. PATENT DOCUMENTS

| | | | |
|---|---|---|---|
| RE37,601 E | 3/2002 | Eastridge et al. | 714/6 |
| 6,353,878 B1 | 3/2002 | Dunham | 711/162 |
| 6,363,385 B1 | 3/2002 | Kedem et al. | 707/10 |
| 6,507,853 B2 | 1/2003 | Bamford et al. | 707/203 |
| 6,549,992 B1 | 4/2003 | Armangau et al. | 711/162 |
| 2001/0014932 A1* | 8/2001 | Suganuma | 711/152 |
| 2004/0059882 A1* | 3/2004 | Kedem et al. | 711/162 |

* cited by examiner

SYSTEM AND METHOD FOR PROVIDING SAFE DATA MOVEMENT USING THIRD PARTY COPY TECHNIQUES

This application is a continuation of U.S. patent application Ser. No. 10/881,313, entitled "System And Method For Providing Safe Data Movement Using Third Party Copy Techniques," filed Jun. 30, 2004, and naming James P. Ohr as the inventor, now U.S. Pat. No. 6,883,076, which in turn is a continuation of U.S. patent application Ser. No. 10/212,427, entitled "System And Method For Providing Safe Data Movement Using Third Party Copy Techniques," filed Aug. 5, 2002, and naming James P. Ohr as the inventor, now U.S. Pat. No. 6,772,308, which in turn is a continuation-in-part of U.S. application Ser. No. 09/924,228, filed Aug. 7, 2001, entitled "System and Method for Preventing Sector Slipping in a Storage Area Network," naming James Ohr as the inventor, now U.S. Pat. No. 6,721,851. The above-referenced applications are hereby incorporated by reference herein in their entirety.

FIELD OF THE INVENTION

The present invention relates to the field of data protection and more particularly to a system and method for using extent guards to provide safe movement of data using third party copy techniques.

BACKGROUND OF THE INVENTION

Recent developments in storage solutions have led to the increased utilization by enterprises of Storage Area Networks (SANs) to provide storage consolidation, reliability, availability, and flexibility. Factors driving these developments include the increase in the amount of on-line data, data protection requirements including efficient and reliable data back-up, and rapidly increasing disk bit densities.

FIG. 1 illustrates a simplified example of an enterprise computing system 100. Servers 110 and 120 are at the heart of computing system 100. As members of enterprise computing system 100, servers 110 and 120 are often referred to as "hosts" or "nodes," and can execute an number of different types of programs including, for example, operating systems, file systems, volume managers, and applications programs such as database systems. FIG. 6 (described below) illustrates some of the features common to servers 110 and 120 as well as client computer systems 130. Servers 110 and 120 can exchange data over network 140, typically a local area network (LAN), e.g., an enterprise-wide intranet, or a wide area network (WAN) such as the Internet. Additionally, network 140 provides a communication path for various client computer systems 130 to communicate with servers 110 and 120.

Other elements of enterprise computer system 100 include storage area network (SAN) 150, SAN switch 160, and storage devices such as tape drive 170, storage array 180, and optical drive 190. As shown in FIG. 1, both servers 110 and 120 are coupled to SAN 150. SAN 150 is conventionally a high-speed network that allows the establishment of direct connections between storage devices 170, 180, and 190 and servers 110 and 120. Thus, SAN 150 is shared between the servers and allows for the sharing of storage devices between the servers to providing greater availability and reliability of storage.

SAN switch 160, tape drive 170, storage array 180, and optical drive 190 are examples of shared resources. The most common shared resource in an enterprise computing environment is some form of shared data resource, such as one or more disk drives. Although a disk device (and various related devices such as storage array 180) is perhaps the most common example of both a shared resource and a shared data resource, a variety of other types of devices will be well known to those having ordinary skill in the art. Moreover, servers 110 and 120 can be connected to SAN 150 through SAN switch 160. Additionally, the shared resources can be directly connected to, or part of, the servers, and thus enterprise computing system 100 need not include a SAN. Alternatively, servers 110 and 120 can be connected to multiple SANs. Additionally, SAN switch 160 can be replaced with a SAN router or a SAN hub.

Protecting the integrity of data as it is moved from one part of a computing system to another is an important aspect of any computer system. Data movement can result from a variety of operations including normal application software operation, data backup operations, data restore operations, and data relocation resulting from system design changes or hardware failures. In many computing systems, data movement is handled by programs executing on servers such as servers 110 and 120. In the case of data movement operations such as data backup and data restore, the use of server resources to handle the data movement means that fewer server resources are available for more typical operations such as application software and operating system overhead. Accordingly, efforts have been taken to move some I/O processing off of system servers to an off host agent. Such agents are often referred to as third-party copy (3PC) devices or data movers.

Third-party copy operations transfer data directly between storage devices in a SAN or other environment using a third-party copy device, copy manager, or data mover 200 such as illustrated in FIG. 2. Data mover 200 can be a separate device as shown; part of a SAN switch, router, bridge, or another SAN network component (not shown) or within a storage element such as storage array 180 in FIG. 1. As is typical of SAN environments, the connection between the servers 110 and 120 and data mover 200 is conventionally a channel protocol bus such as SCSI or fibre channel connected directly to the storage devices or storage device controllers (e.g. RAID controllers). Thus, the data mover operates on behalf of some other piece of software, e.g., a backup or restore application, to accomplish the third party copy operation.

In one example of a third party copy device, the device implements the SCSI-3 extended copy command. SCSI-3 commands are described in *SCSI Primary Commands*—3 (SPC-3), Working Draft, Revision 03, T10, a Technical Committee of the Accredited Standards Committee of the National Committee for Information Technology Standards (NCITS), 10 Jan. 2002, which is hereby incorporated by reference herein in its entirety. The extended copy command provides a SCSI command to copy data from one set of devices to another. These devices can be disks, tapes, or other types of storage devices. This SCSI protocol command can be used on devices connected via SCSI cables or Fibre Channel connections. The data mover is the device that receives and performs the extended copy command. Another device is an intelligent device somewhere in the storage infrastructure that understands the extended copy command. This can be another server, but more likely will be a smart-storage device, such as an intelligent tape device, disk device, SAN switch or storage router. The host server typically has some extra processing to perform at first, in order to gather all the file or volume information necessary to pass along inside the extended copy command. Additionally, if either the source or destination of the extended copy is a removable media device, then the host will typically first issue other SCSI commands to get the removable device into the proper position (loading or positioning the tape). Next, the host issues the extended copy command to the data mover, telling the device to move data from one storage device directly to another storage device. After issuing the extended copy command, no further instructions have to be issued by the host to move the data—the devices themselves perform the entire data movement operation over the SCSI bus or Fibre Channel connection.

As illustrated in FIG. 2, storage devices 210 and 220 are coupled to the SAN 150. In this example, storage devices 210 and 220 are shown as a data source and a data destination respectively (e.g., illustrating a restore operation from a tape drive to a hard disk), but such devices can typically operate as either data sources or data destinations. Alternately, source storage devices can be directly coupled to the SAN 150 through data mover 200. In still another example, data mover 200 can be included as part of a proprietary storage device, such as a storage array. Thus, data movers 200 can be implemented as independent devices, devices in traditional SAN components, or even as software executing on a SAN component, e.g., software executing on a storage device controller.

In general, data to and from storage devices is provided using either block-level or file-level access. File level access requires some knowledge of the underlying file system and/or volume management system used to organize data on the storage devices. This type of information is typically available only at the host level, and thus I/O operations utilizing file-level access must be performed or at least managed by software executing on a host computer. Block-level access uses physical storage device addresses to access data and thus need not be "assisted" by some entity having file system and/or volume knowledge. Third-party copy operations typically utilize block-level access because of the inherent speed and efficiency gained by avoiding heavy use of host resources.

Returning to the example illustrated in FIG. 2, third-party copy data transfers are initiated when an application operating on one of the servers provides the data mover 200 with the addresses of the source and destination devices and blocks. For example, a data restore application executing on server 110 can request that certain data on a tape in data source 210 be restored to a disk drive in data destination 220. Such address information is typically in the form of an extent list having one or more extents. An extent is typically a contiguous set of storage blocks allocated for a file portion, a file, or multiple files. Extents are typically represented by a device address indication, a starting block address on that device, and a length (number of contiguous blocks). However, extents can be defined in a variety of different ways, e.g., a starting address and an ending address, no device information explicitly included, etc. Thus, an extent is generally any information used to locate a desired portion of a storage resource.

For the purposes of this example, data destination 220 is a block (disk) device on which a file system or database resides and data source 210 can be any block or stream device (a serial device such as a tape drive). Once initiated, a third-party copy operation generally operates separately from any file system, volume management, or application program activity on the system servers. Thus, since the server can reorganize or write to data residing on data destination 220 asynchronously of the third-party copy operation, there is considerable risk in moving data into a live file system or database on the data destination. Potential error conditions can arise due to a reorganization and/or modification of the data destination device after an extent list initiated by a third-party copy request has been generated and sent to the data mover 200.

The potential error conditions can be referred to as "sector slipping" events and manifest themselves as two error states on the data destination device. A first sector slipping error state involves a movement of data or allocated space from the destination extents to another physical location (e.g. volume reorganization). As illustrated in FIG. 3A, disk 1 300 is organized as volume A and includes destination blocks 310 corresponding to destination extents that are to be written to by a third-party copy operation. Some time after the list of data extents has been provided to the data mover, but before the third-party copy operation has completed, an error is detected on disk 1 300 causing a volume manager to move all data for volume A from disk 1 300 to disk 2 320. Since the third-party copy operation has not yet completed and the destination blocks 310 have moved, there exists the possibility that the destination blocks 310 moved from disk 1 to disk 2 will not reflect all the data intended to be copied by the third-party copy operation. Furthermore, the data mover has no way of knowing that the reorganization is taking place and continues to move blocks into the destination blocks 310 on disk 1.

Another error state is illustrated in FIG. 3B. Disk 1 350 is partitioned into two volumes, volume A and volume B. Volume A includes destination blocks 360 corresponding to destination extents that are to be written to by a third-party copy operation. Volume B includes application data 370 that is, in general, unrelated to the data associated with destination blocks 360. Some time after the list of data extents has been provided to the data mover, but before the third-party copy operation has completed, the storage space on disk 1 is reallocated so that volume A is moved to disk 2 380 and volume B is reorganized on disk 1. In this example, the reorganization of volume B included movement of application data 370 to an area of disk 1 that includes destination blocks 360. Thus, as the data mover writes to destination blocks 360, it may be erroneously writing over valid application data.

Accordingly, it is desirable to provide safe and accurate data movement in third-party copy operations.

SUMMARY OF THE INVENTION

It has been discovered that systems, methods, apparatus and software can utilize an extent guard to prevent modification (including relocation) of data in the storage resource while a third-party copy operation directed at the storage resource is occurring. A data transport mechanism such as a data restore application provides an extent list to the extent guard, which monitors read and/or write activity to storage resources described by the extent list. The data transport mechanism requests a data mover to perform a third-party copy operation whereby data is moved from a data source to the storage resource. If a modification attempt is made on the portion of the storage resource described by the extent list, the extent guard stalls the modification attempt until the third-party copy operation is aborted.

Accordingly, one aspect of the present invention provides a method. The method includes receiving an extent list including at least one extent describing a portion of a destination storage resource. A data modification request is received. Whether the data modification request targets the portion of the destination storage resource is determined.

The data modification request is stalled when the data modification request is determined to target the portion of the destination storage resource. At least one of a data mover and a data transport application is notified of a need to abort a third-party copy operation.

In another aspect of the present invention, a system includes an extent guard and a data transport module. The extent guard is configured to receive an extent list including at least one extent describing a portion of a destination storage resource, receive a data modification request, and determine whether the data modification request targets the portion of the destination storage resource. The data transport module is configured to initiate a third-party copy operation and indicate completion of the third-party copy operation when the third-party copy operation is complete.

In still another aspect of the present invention, and apparatus includes a receiving means, a determining means, a stalling means, and a notifying means. The receiving means is for receiving an extent list including at least one extent describing a portion of a destination storage resource, and for receiving a data modification request. The determining means is for determining whether the data modification request targets the portion of the destination storage resource. The stalling means is for causing the stalling of the data modification request when the data modification request is determined to target the portion of the destination storage resource. The notifying means is for notifying at least one of a data mover and a data transport application of a need to abort a third-party copy operation.

The foregoing is a summary and thus contains, by necessity, simplifications, generalizations and omissions of detail. Consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 1:
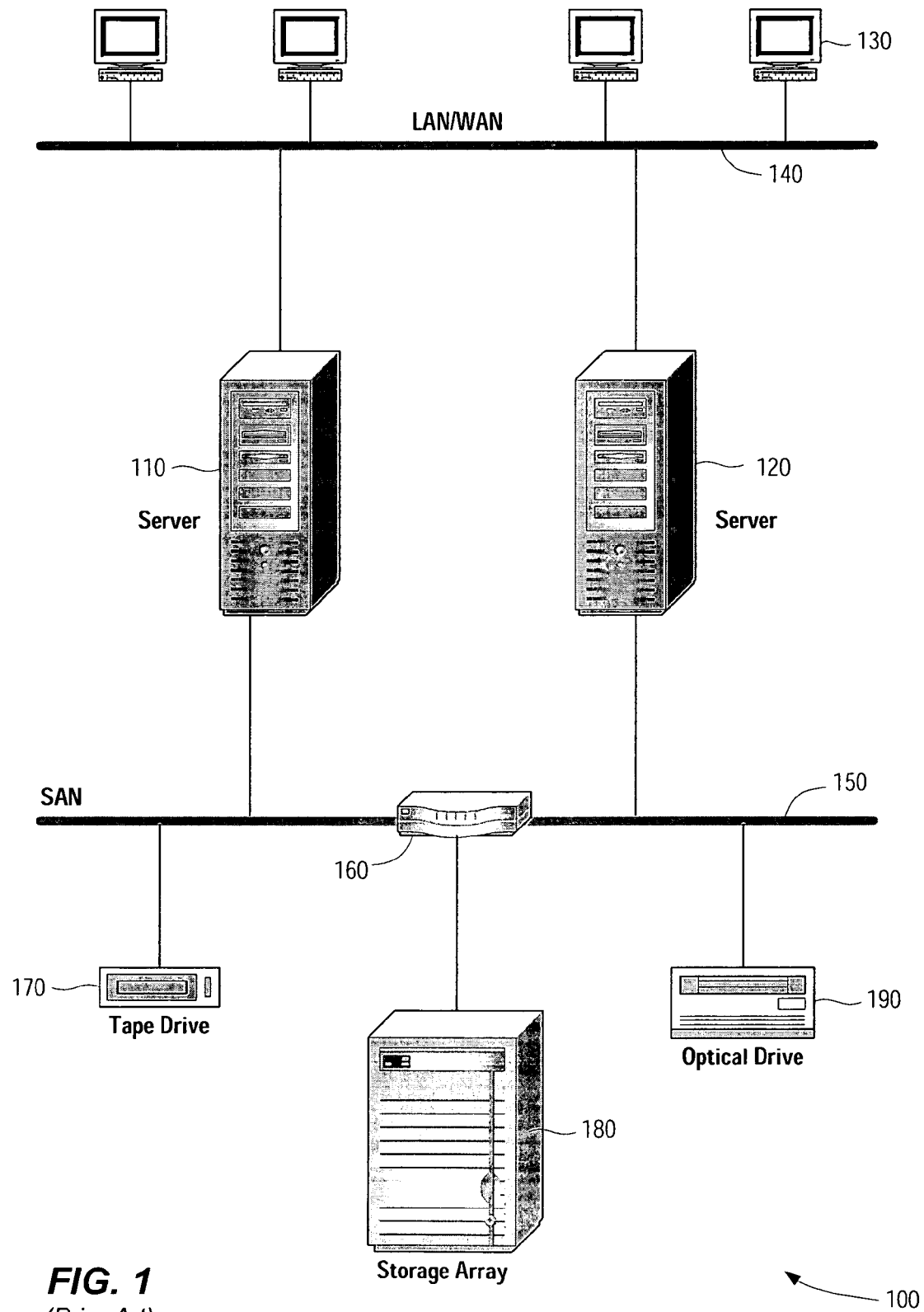
FIG. 1 is a simplified block diagram of an enterprise computer system.
Figure 2:
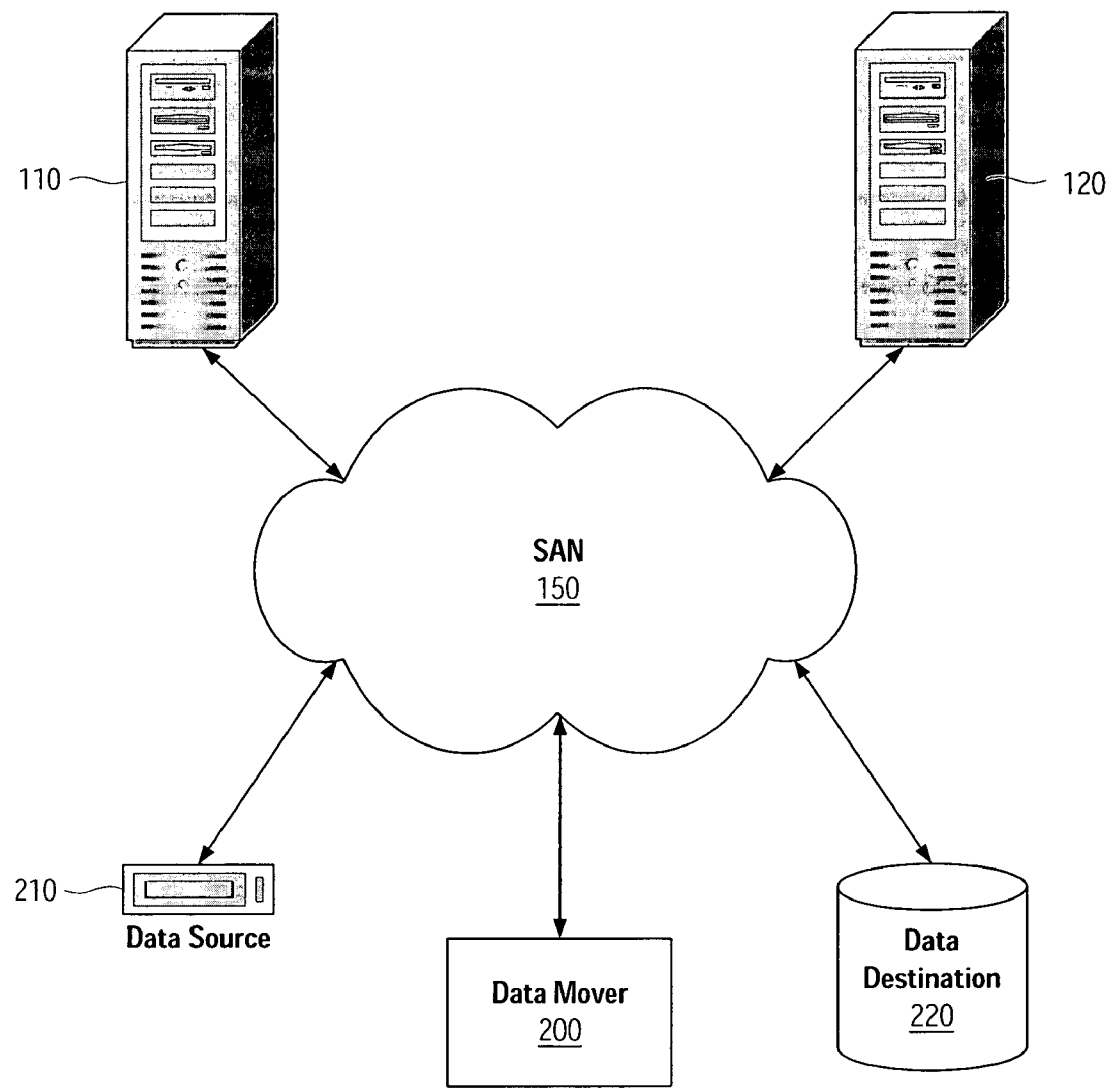
FIG. 2 illustrates the use of a data mover to move data from a source to a destination.
Figure 4A:
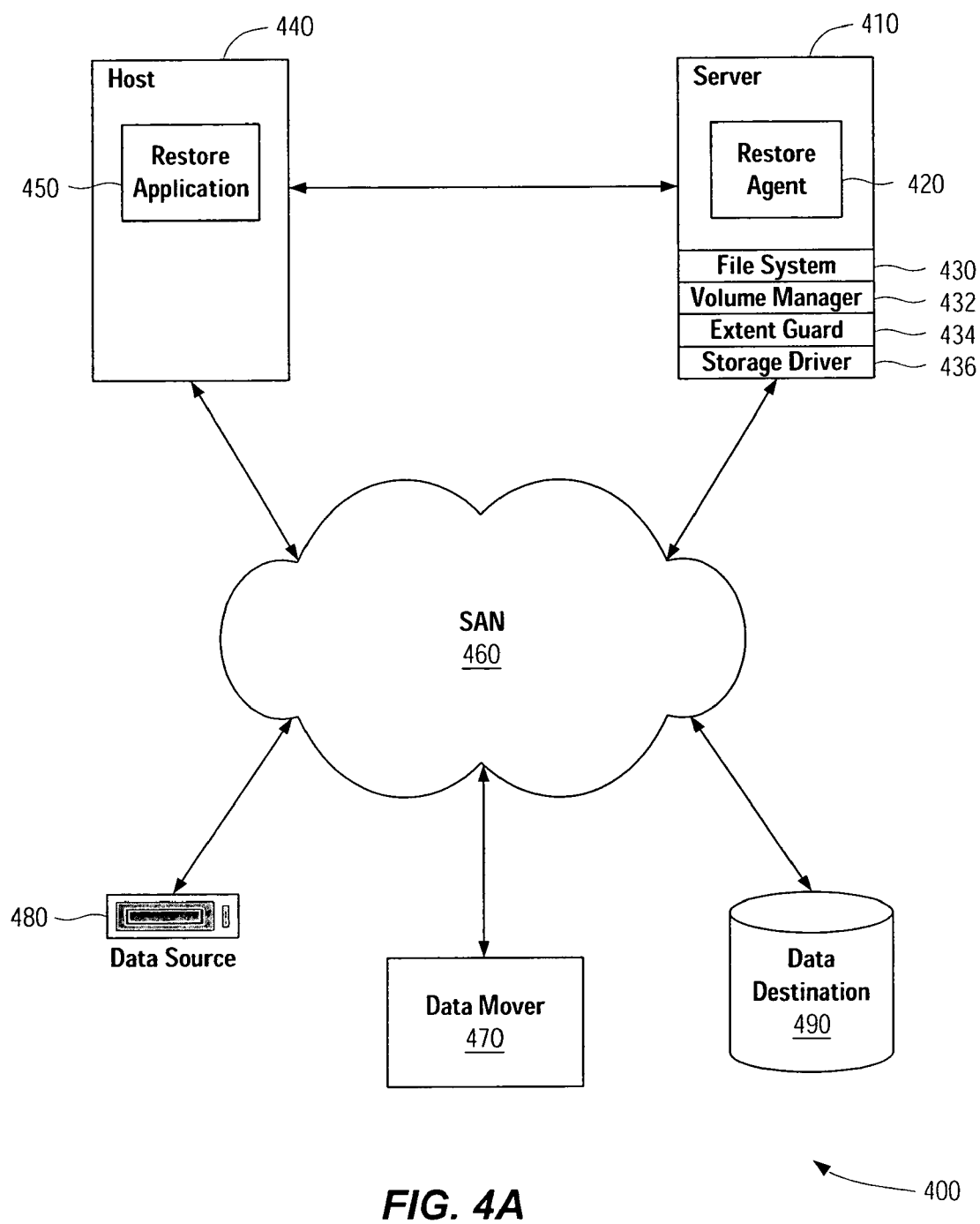
FIGS. 4A and 4B are simplified block diagrams of computer systems using extent guards in the context of a third-party copy operation.

FIG. 4A is a simplified block diagram of a computer system using an extent guard in the context of a third-party copy operation. In general, computer system 400 can be part of a larger computer system such as enterprise computer system 100 of FIG. 1. Server 410 includes file system software 430, volume management software 432 extent guard software 434 and storage driver software 434 executing on the server. File system software provides and/or supports additional (beyond typical operating system file system capabilities) file system features including for example: quick-recovery, journaling, backup without data lock out, and online file system resizing. Volume manager software enables physical resources configured in the computer system to be managed as logical devices or volumes. Software such as 430 and 432 can be part of the operating system executing on server 410, or it can comprise one or more specialized components such as the VERITAS Volume Manager™ and VERITAS File System™ products provided by VERITAS Software Corporation.

As will be discussed in greater detail below, extent guard 434 intercepts storage resource modification commands, e.g., disk reads and writes, from server 410's operating system or other software components such as file system 430 and volume manager 432. In general, data modification includes both writing to a portion of the storage resource thereby changing the data values stored therein and moving the data to another physical location as might be required during a hardware failure or a disk defragmentation operation. In the example illustrated, extent guard 434 is located between system software components, e.g., those software components that typically request or manage requests for storage resource reads and writes, and a storage device driver. Alternately, extent guard 434 can be incorporated into one or more server software components such as file system 430, volume manager 432, or storage driver 436.

Server 410 utilizes storage resources including data source 480 and data destination 490. As illustrated in FIG. 4A, data source 480 is a tape drive typically used for performing data backup and restore operations. Data destination 490 is typically one or more disk drives or disk drive arrays. Storage resources are coupled to server 410 through storage area network 460.

Host 440 executes a data transport application such as restore application 450. Although restore application 450 is illustrated, a variety of different data transport applications can be used including those supporting disk-to-disk transfers and any application designed to take advantage of third-party copy operations. Host 440 is illustrated as a separate computer system, e.g., another server or a client computer system coupled to server 410 via a network such as a LAN or WAN. Restore application 450 communicates with server 410's file system, volume manager, and/or operating system via restore agent 420. Alternately, restore application 450 can communicate directly with file system, volume manager, and/or operating system components executing on server 410. In other examples, restore application 450 need not communicate directly or indirectly with file system, volume manager, and/or operating system components. Similarly, restore agent 420 can be designed to interface with extent guard 434, but need not interface with file system, volume manager, and/or operating system components. Additionally, restore application 450 need not be executing on a separate computer system such as host 440, but can instead execute as one or more processes on server 410.

Data mover 470 is a device for performing third-party copy operations as previously described. Data mover 470 can be a separate device as shown; part of a SAN switch, router, bridge, or another SAN network component (not shown); part of a storage resource such as data destination 490; or a process executing on a controller or processor associated with any of these devices. Although each of data source 480, data mover 470 and data destination 490 are all shown as coupled to server 410 and host 440 through SAN 480, it will be obvious to those having ordinary skill in the art that one, some, or all of the devices can be coupled directly to one or more of server 410 and host 440, and thus SAN 460 need not be utilized.

Figure 4B:
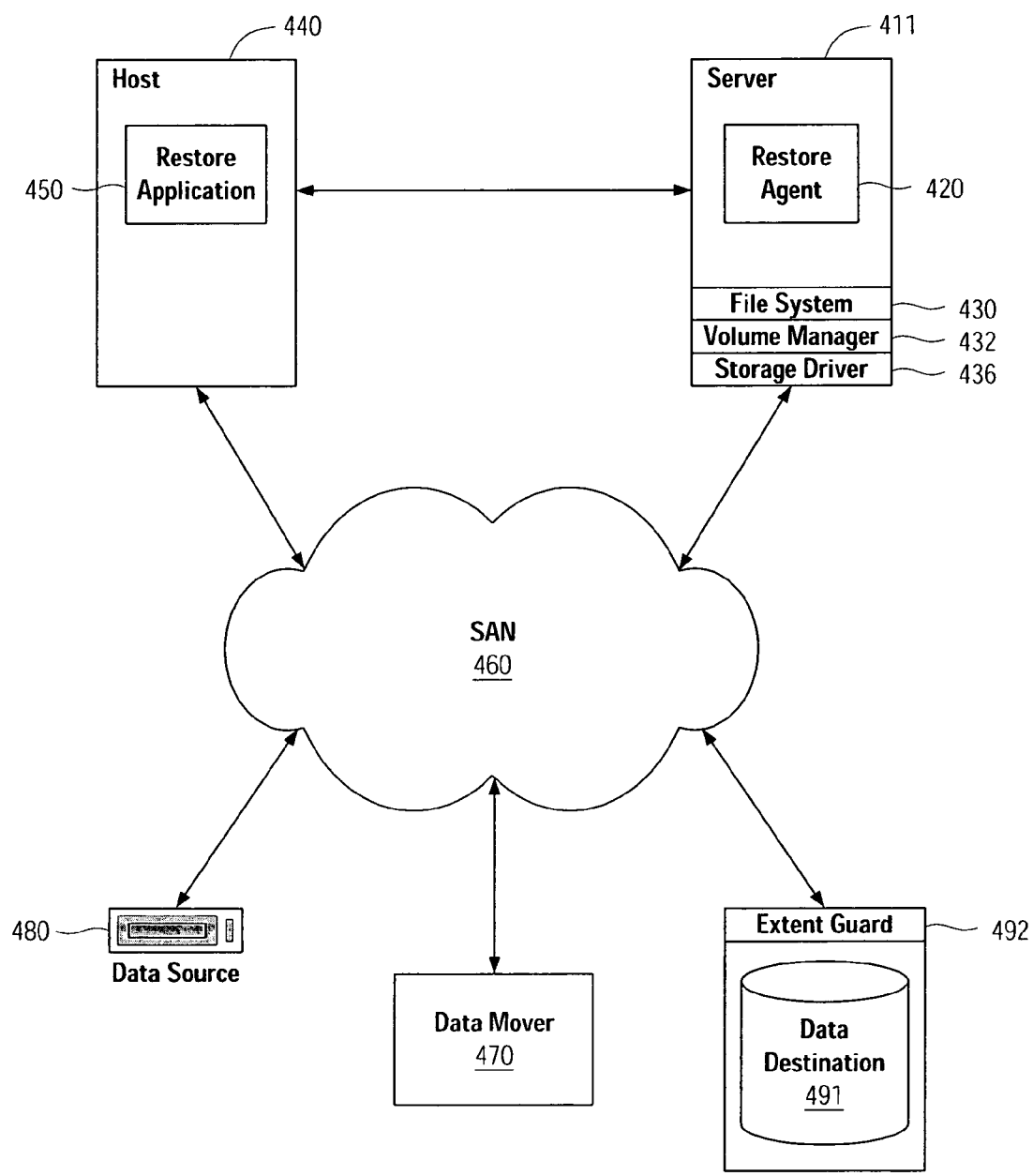

FIG. 4B illustrates an alternate computer system 401 implementing an extent guard variation. The principal differences between computer system 400 of FIG. 4A and computer system 401 of FIG. 4B lie in the location of the extent guard. Server 411 does not include an extent guard. Instead, data destination 491 includes sufficient processing capabilities, e.g., a controller or processor, to execute software functioning as extent guard 492. Thus, data destination 491 might be a disk array such as array 180 illustrated in FIG. 1, or some other storage device. Instead of intercepting storage resource modification attempts at server 411, extent guard 492 intercepts those modification attempts as they arrive at data destination 491. Such an implementation might be advantageous, for example, where there are multiple servers in the computer system but only one (or a small number) of data destinations.

Figure 5A:
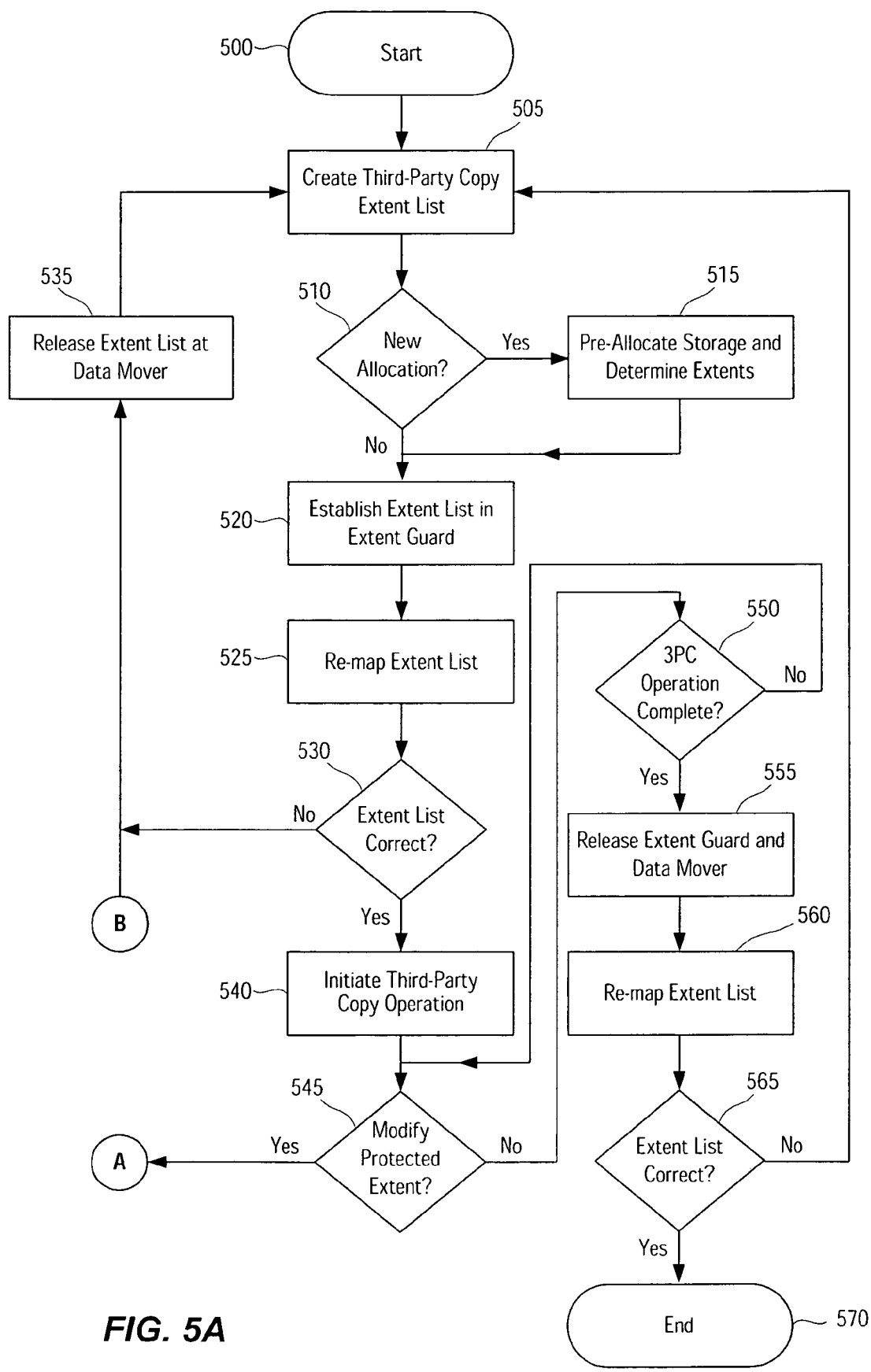
FIGS. 5A and 5B are flow charts illustrating techniques of the present invention.
Figure 5B:
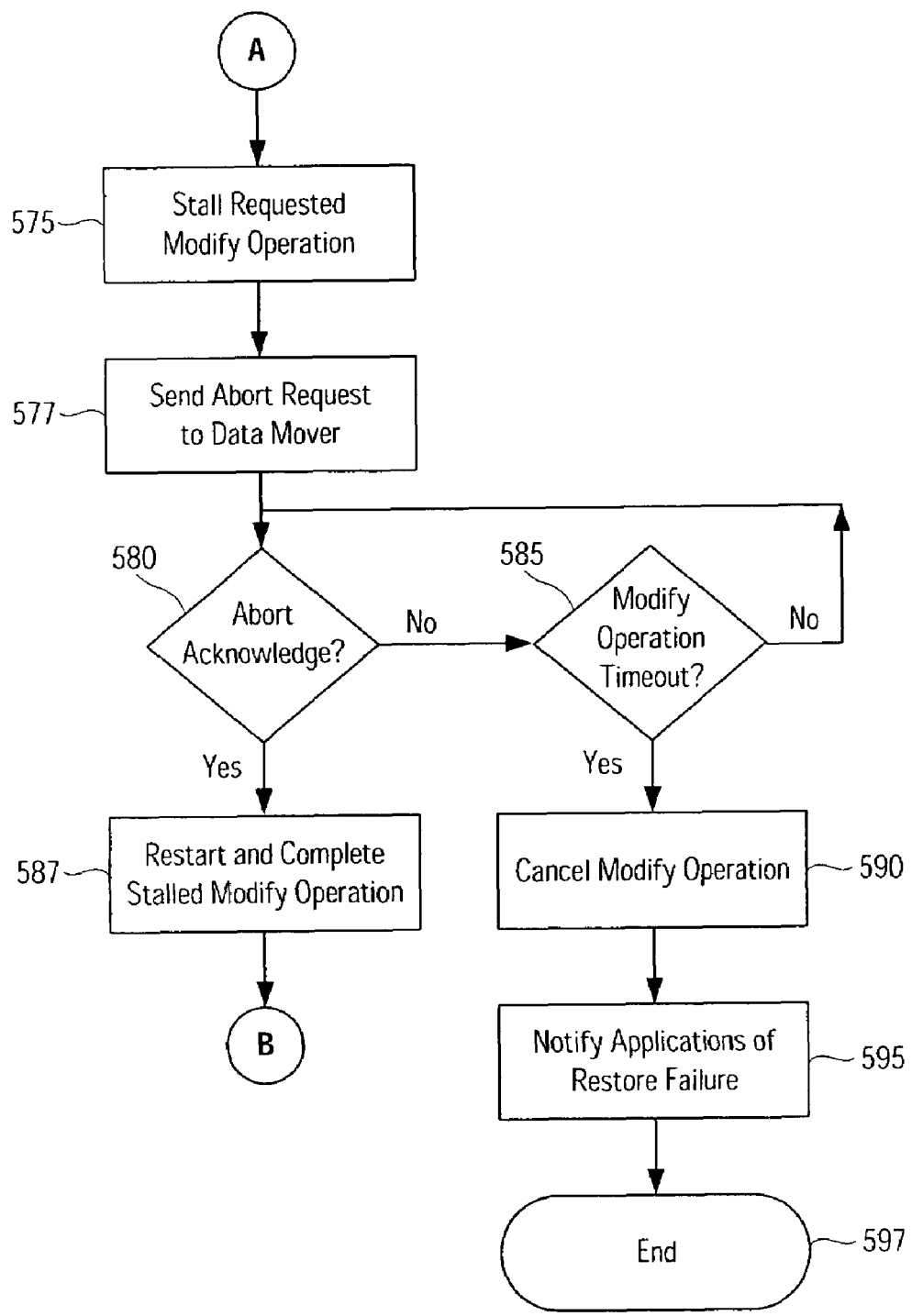

Operation of systems and methods for providing safe third-party copy data movement are illustrated in FIGS. 5A and 5B. Operation begins 500 when some data transport mechanism such as restore application 450 is invoked. In the examples described below, a data restore application will be utilized, but those having ordinary skill in the art will readily recognize that a variety of data transport applications can utilize both third-party copy operations and the protection schemes described in the present application. A third-party copy extent list is created (e.g., a "source" extent list) as shown in step 505. For example, if a user of computer system 400 wishes to restore a data file from a tape in data source 480 to a disk drive in data destination 490, an extent list will be created describing the data to be restored. Next, a determination is made 510 as to whether a new allocation of a portion of the storage resource (in this case data destination 490) needs to occur. For example, if the restore operation will be restoring one file onto the space occupied by a previous version of the file and both files require the same space, then no new space allocation is necessary and operation proceeds directly to step 520. If a new space allocation is required, that allocation is performed at 515 where the storage is pre-allocated and the extents describing that storage portion are determined. Step 515 is typically performed by an operating system, a file system, a volume manager, or some combination thereof.

In either case a "destination" extent list is provided representing the portion of the storage resource to which the data will be restored. Typically, the destination extent list is provided to the restore application. Next, the destination extent list is established in the extent guard at 520. In one embodiment, the restore application sends this extent list to the extent guard so that the extent guard can monitor modification attempts made to the portion of storage resources described by the extent list. Once an extent list is received, the extent guard may send an acknowledgement message back to the device or process that sent the extent list. This message serves to notify the sender that the extent list was successfully received and that a third-party copy operation can be initiated with the protection in place. In some examples, the acknowledgement message can include an identifier describing an extent guard session.

Steps 525 and 530 illustrate operations that can be performed to further insure that there has been no change to the destination extents between the time the destination extent list was determined and the time the extend guard receives the extent list and begins protecting the identified portion of the storage resource. For example, if there is some modification to the data in the destination extent before the extent list is established in the extent guard, and error condition can occur. Thus, the destination extent list is re-mapped in step 525 and compared with the extent list that was sent to the extent guard in step 530 to determine if a change has occurred. If the extent list is correct, operation proceeds to 540. If the extent list is incorrect, it is released 535 and operation returns to 505 as shown. In another embodiment, operation can return instead to 510 to determine a new destination extent list. In an alternate embodiment not illustrated, the destination extents are established in the extent guard as they are determined so that steps 525 and 530 can be eliminated.

In step 540, one or more extent lists, typically both the source and destination, extent lists, are sent to a data mover and the third-party copy operation is initiated. While the third-party copy operation is being performed, there may be some attempt to modify the portion of the data destination being guarded by the extent guard. Step 545 illustrates monitoring performed by the extent guard to determine if an attempt has been made by some device or process (other than the authorized data mover) to modify the portion of the storage resource described by the extent list. If there is no attempt to modify a protected extent, a determination is made at 550 whether the third-party copy operation is complete. Such a determination can take a variety of forms. For example, restore application 450 can poll data mover 470 to determine if the third-party copy operation is complete. Alternately, restore application 450 can wait for an indication from data mover 470 that the operation is finished. If the third-party copy operation is not complete, the process loops back to 545 for modification attempt determination. If the third-party copy operation is complete, the extent list is released (step 555) at the data mover and the extent guard. Releasing the extent guard can include one or more sub-steps (not shown) such as (1) restore application requesting the release by, for example, providing the session identifier and a release request to the extent guard; (2) the extent guard ceasing to monitor the extents; and (3) the extent guard providing some acknowledgment to the restore application.

Figure 3A:
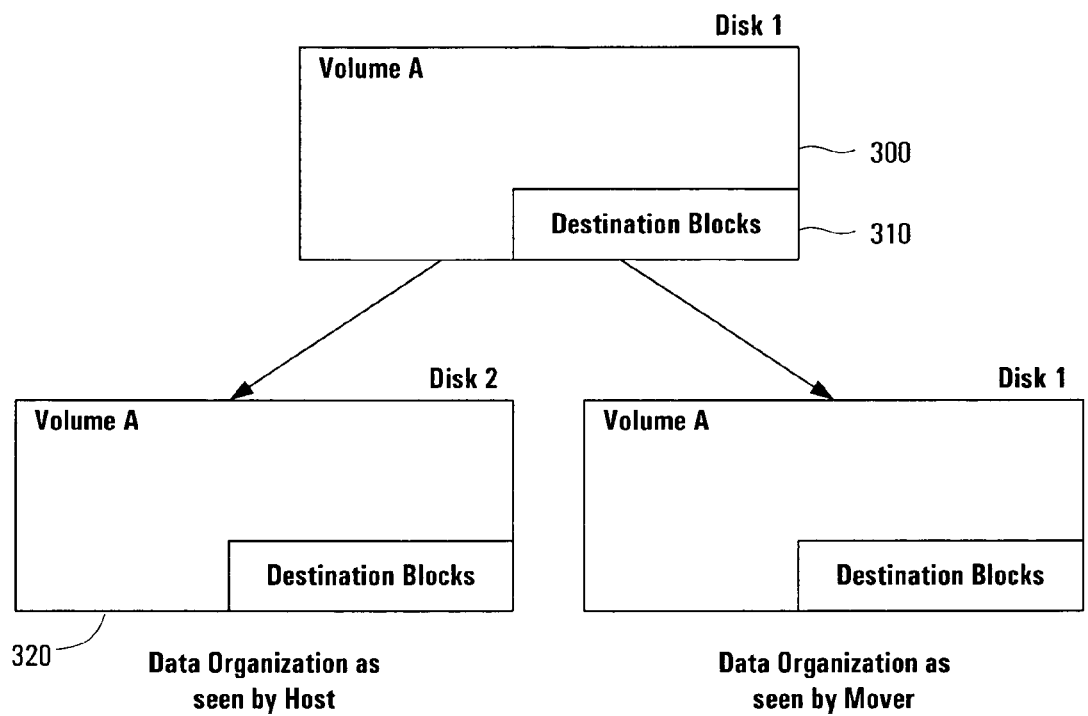
FIGS. 3A and 3B illustrate potential error conditions associated with extent based third-part copy operations.
Figure 3B:
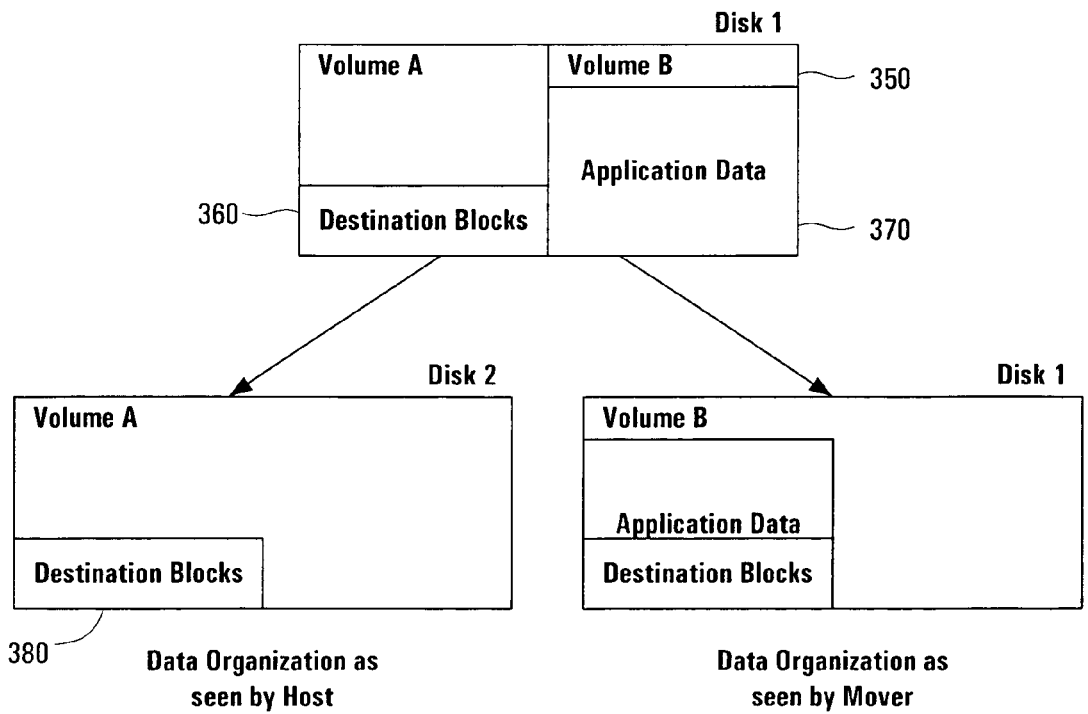

Some changes associated with the storage resource can occur that might not be identified by the extent guard. For example, depending upon the types of operation that the extent guard watches for, the extent guard might not be able to detect that a volume reorganization has occurred and thus the error condition described above in the context of FIG. 3A can occur. If it is the case that the extent guard cannot monitor all error producing events, additional steps such as 560 and 565 might be warranted. In 560 the destination extent list is re-mapped to determine if there has been a change to the mapping of the relevant extent(s). If the extent list is correct, i.e., there has been no change, then the process terminates at 570. If instead a change is detected, operation transitions to 505 (or alternately 510) so that the process can be repeated with the correct extent list.

If there was an attempt to modify a protected extent, the extent guard attempts to stall the modify request at 575. For example, if some other process attempts to write to a guarded extent, the extent guard intercepts this write attempt and prevents a write operation from passing through to the data destination. In one embodiment, the extent guard can, in addition to preventing the modification attempt from passing through to the data destination, send some message to the device or process attempting the modification. In step 577, a request is sent to the data mover to abort the third-party copy operation. In one example, the extent guard sends an indication to the restore application that a modification attempt has occurred and the restore application sends an abort request to the data mover. Alternately, the extent guard can inform the data mover directly. If the abort request is acknowledged at 580, an indication is sent at step 587 to allow the modification attempt to be completed. With the third-party copy operation terminated, operation transitions to 535 and the process can begin again. In one embodiment, the data mover terminates the third-party copy operation and sends an abort acknowledgement to the restore application. The restore application in turn informs the extent guard.

If no abort acknowledgement is received at 580, a determination is made 585 whether the modification attempt has timed-out. If the modification attempt has not timed-out, operation returns to 580. If the modification attempt has timed-out, the modification operation is cancelled 590 and all relevant applications/processes are notified at 595 that a restore failure has occurred. The process then terminates 597.

In one embodiment, only certain modification attempts, e.g., those with some high priority designation such as modification needed to relocate data because of a hardware failure, are allowed to interrupt the third-party copy operations. In such an example, the extent guard evaluates the priority of the modification attempt and depending upon that evaluation will either attempt to terminate the third-party copy operation or not. Additionally, the extent guard can be configured to determine whether the portion of the storage resource targeted by the modification attempt has already been affected by the third-party copy operation. If that is the case, then it may be safe to allow the modification attempt to proceed while allowing the third-party copy operation to complete.

Additionally, the re-mapping and comparisons steps 525, 530, 560, and 565 can in some cases be eliminated and in other cases replaced with comparable steps. For example, instead of re-mapping, the portion of the storage resource described by the destination extent list and/or the object or objects stored therein can have an associated configuration identifier. Upon allocation of the extents, the configuration identifier can be passed to the extent guard and/or the restore application. At later times when there is some concern that some change associated with the relevant extents has occurred, the current configuration identifier can be compared with the original configuration identifier to determine if in fact a change has occurred.

The flow charts of FIGS. 5A and 5B illustrate some of the many operational examples of a third-part copy data protection scheme. Those having ordinary skill in the art will readily recognize that certain steps illustrated in FIGS. 5A and 5B can be eliminated or taken in an alternate order. Moreover, the methods described in FIGS. 5A and 5B are typically implemented as one or more software programs for a computer system, that is encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Figure 6:
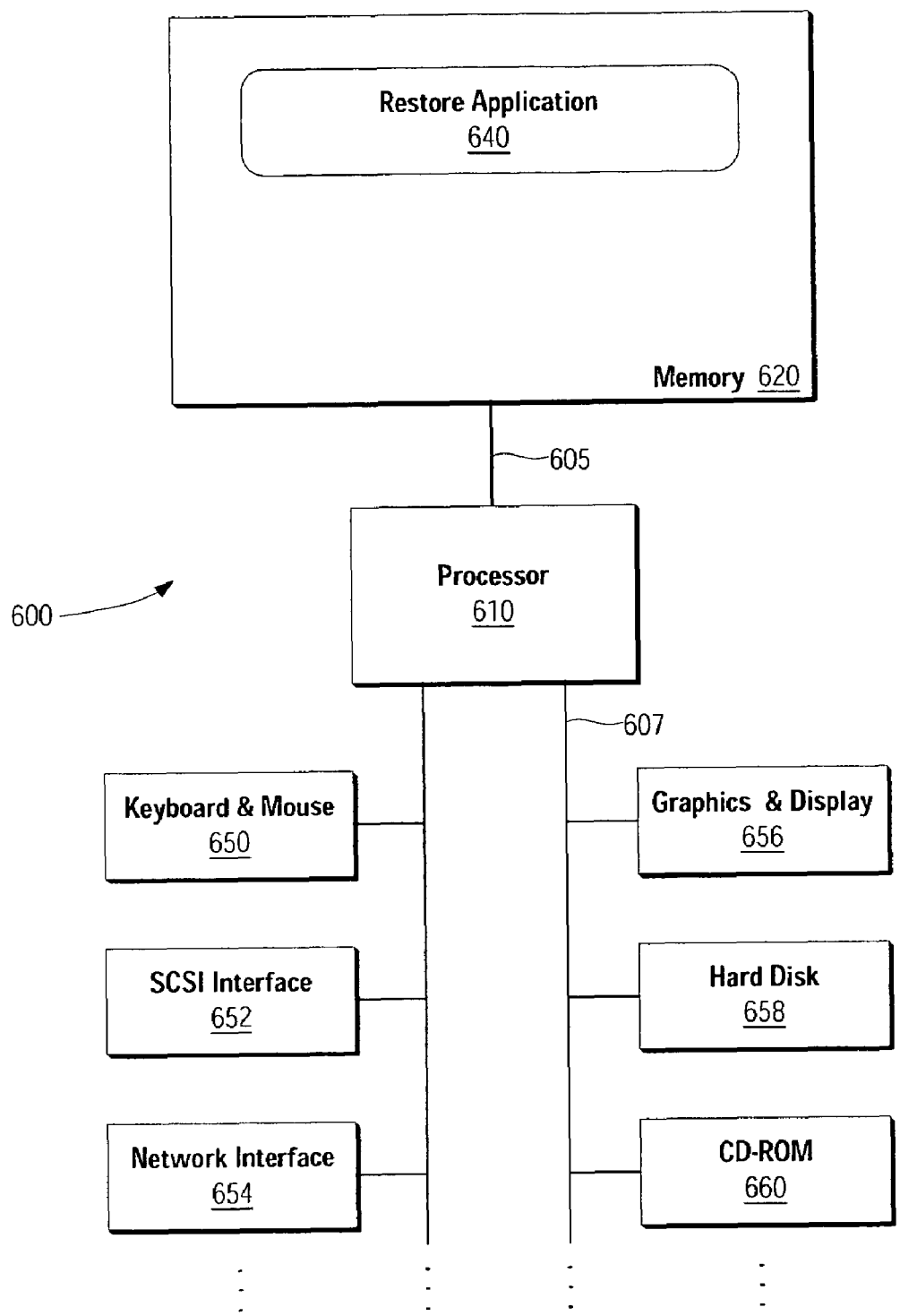
FIG. 6 is a simplified block diagram of a computer system for implementing the techniques of the present invention.

FIG. 6 illustrates a block diagram of a computer system 600 for implementing the techniques of the present invention. For example, computer system 600 can be an embodiment of one of the previously described servers, clients or hosts. Computer system 600 includes a processor 610 and a memory 620 coupled together by communications bus 605. Processor 610 can be a single processor or a number of individual processors working together. Memory 620 is typically random access memory (RAM), or some other dynamic storage device, and is capable of storing instructions to be executed by the processor, e.g., restore application 640 and extent guard software (not shown). Memory 620 is also used for storing temporary variables or other intermediate information during the execution of instructions by the processor 610.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Perl and Tcl/Tk. Additionally, software 640 can be provided to the computer system via a variety of computer readable media including electronic media (e.g., flash memory), magnetic storage media (e.g., hard disk 658, a floppy disk, etc.), optical storage media (e.g., CD-ROM 660), and communications media conveying signals encoding the instructions (e.g., via a network coupled to network interface 654).

Computer system 600 also includes devices such as keyboard & mouse 650, SCSI interface 652, network interface 654, graphics & display 656, hard disk 658, and CD-ROM 660, all of which are coupled to processor 610 by communications bus 607. It will be apparent to those having ordinary skill in the art that computer system 600 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications fall within the scope of the appended claims.

The invention claimed is:

1. A method comprising:
   initiating a data restore operation, wherein the data restore operation targets a plurality of blocks of a storage resource;
   determining whether an input/output (I/O) operation targets at least one of the plurality of blocks of the storage resource;
   preventing the I/O operation from being performed on the at least one of the plurality of blocks of the storage resource when the at least one of the plurality of blocks of the storage resource has not yet been affected by the data restore operation;

allowing the I/O operation to be performed on the at least one of the plurality of blocks of the storage resource subsequent to the preventing the I/O operation from being performed;

notifying at least one of a data mover and a data transport application of a need to abort a third-party copy operation before the allowing the I/O operation to be performed;

sending an extent guard indication to the data transport application;

sending a third-party copy operation abort request from the data transport application to the data mover; and receiving acknowledgement from the data mover before allowing the I/O operation to be performed.

2. The method of claim 1 further comprising:

allowing the I/O operation to be performed on the at least one of the plurality of blocks of the storage resource when the at least one of the plurality of blocks of the storage resource has been affected by the data restore operation.

3. The method of claim 1 further comprising:

preventing the I/O operation from being performed on the at least one of the plurality of blocks of the storage resource when the at least one of the plurality of blocks of the storage resource has been affected by the data restore operation.

4. The method of claim 1 further comprising:

notifying the data mover application of the need to abort the third-party copy operation.

5. The method of claim 1 further comprising:

evaluating a priority of the I/O operation and selectively performing the preventing the I/O operation from being performed depending on the evaluating.

6. The method of claim 1 wherein the initiating a data restore operation further comprises:

receiving an extent list including at least one extent describing a portion of the plurality of blocks of a storage resource; and verifying the extent list prior to performing the preventing the I/O operation from being performed.

7. The method of claim 1 wherein the initiating a data restore operation, the determining, and the preventing the I/O operation from being performed are performed by an extent guard application executing on at least one of a data mover and a computer system.

8. A computer readable storage medium comprising program instructions executable on a processor, the computer readable storage medium being at least one of an electronic storage medium, a magnetic storage medium, and an optical storage medium, wherein the program instructions are operable to:

initiate a data restore operation, wherein the data restore operation targets a plurality of blocks of a storage resource;

determine whether an input/output (I/O) operation targets at least one of the plurality of blocks of the storage resource;

prevent the I/O operation from being performed on the at least one of the plurality of blocks of the storage resource when the at least one of the plurality of blocks of the storage resource has not yet been affected by the data restore operation;

allow the I/O operation to be performed on the at least one of the plurality of blocks of the storage resource subsequent to the preventing the I/O operation from being performed;

notify at least one of a data mover and a data transport application of a need to abort a third-party copy operation before the allowing the I/O operation to be performed;

send an extent guard indication to the data transport application;

send a third-party copy operation abort request from the data transport application to the data mover; and receive acknowledgement from the data mover before allowing the I/O operation to be performed.

9. The computer readable storage medium of claim 8 further comprising program instructions operable to allow the I/O operation to be performed on the at least one of the plurality of blocks of the storage resource when the at least one of the plurality of blocks of the storage resource has been affected by the data restore operation.

10. The computer readable storage medium of claim 8 further comprising program instructions operable to prevent the I/O operation from being performed on the at least one of the plurality of blocks of the storage resource when the at least one of the plurality of blocks of the storage resource has been affected by the data restore operation.

11. The computer readable storage medium of claim 8 further comprising program instructions operable to:

notify at least one of a data mover and a data transport application of a need to abort a third-party copy operation.

12. The computer readable storage medium of claim 8 further comprising program instructions operable to:

evaluate a priority of the I/O operation and selectively performing the preventing the I/O operation from being performed depending on the evaluating.

13. The computer readable storage medium of claim 8 wherein the initiating a data restore operation further comprises program instructions operable to:

receive an extent list including at least one extent describing a portion of the plurality of blocks of a storage resource; and verify the extent list prior to performing the preventing the I/O operation from being performed.

14. An apparatus comprising:

means for initiating a data restore operation, wherein the data restore operation targets a plurality of blocks of a storage resource;

means for determining whether an input/output (I/O) operation targets at least one of the plurality of blocks of the storage resource; and means for preventing the I/O operation from being performed on the at least one of the plurality of blocks of the storage resource when the at least one of the plurality of blocks of the storage resource has not yet been affected by the data restore operation;

means for allowing the I/O operation to be performed on the at least one of the plurality of blocks of the storage resource subsequent to the prevention of the performance of the I/O operation;

means for notifying at least one of a data mover and a data transport application of a need to abort a third-party copy operation before the I/O operation is allowed to be performed;

means for sending an extent guard indication to the data transport application;

means for sending a third-party copy operation abort request from the data transport application to the data mover; and means for receiving acknowledgement from the data mover before allowing the I/O operation to be performed.

15. The apparatus of claim 14 further comprising:

means for allowing the I/O operation to be performed on the at least one of the plurality of blocks of the storage resource when the at least one of the plurality of blocks of the storage resource has been affected by the data restore operation.

16. The apparatus of claim 14 further comprising:

means for preventing the I/O operation from being performed on the at least one of the plurality of blocks of the storage resource when the at least one of the plurality of blocks of the storage resource has been affected by the data restore operation.

17. The apparatus of claim 14 further comprising:

means for evaluating a priority of the I/O operation and selectively performing the preventing the I/O operation from being performed depending on the evaluating.

18. The apparatus of claim 14 further comprising:

means for receiving an extent list including at least one extent describing a portion of the plurality of blocks of a storage resource; and means for verifying the extent list prior to performing the preventing the I/O operation from being performed.

* * * * *